(12) United States Patent
Wooderson

(10) Patent No.: US 6,824,004 B1
(45) Date of Patent: Nov. 30, 2004

(54) HANDLE FOR LIFTING, MOVING AND SECURING THE LID OF A COOKING UTENSIL

(75) Inventor: Blaise M. Wooderson, Olathe, KS (US)

(73) Assignee: Innovation IP Holding Co., Davenport, IA (US)

( * ) Notice: Subject to any disclaimer, the term of this patent is extended or adjusted under 35 U.S.C. 154(b) by 0 days.

(21) Appl. No.: 10/232,788

(22) Filed: Aug. 29, 2002

(51) Int. Cl.[7] .............................................. B65D 45/02
(52) U.S. Cl. ...................................................... 220/318
(58) Field of Search ................................ 220/756, 318, 220/752, 754, 755, 757, 761, 765, 766, 769, 770, 772, 315, 317

(56) References Cited

U.S. PATENT DOCUMENTS

| | | |
|---|---|---|
| 1,384,851 A | 7/1921 | Richardson |
| 1,666,012 A | 4/1928 | Humphrey |
| 1,685,560 A | 9/1928 | Trulock |
| 1,698,929 A | 1/1929 | Wentorf |
| 2,403,191 A | 7/1946 | Philips |
| 3,080,996 A | 3/1963 | Graham |
| 3,416,701 A | 12/1968 | Kramer et al. |
| 3,471,054 A | 10/1969 | Ostrowsky et al. |
| 3,518,731 A | 7/1970 | Ostrowsky et al. |
| 3,592,352 A | 7/1971 | Shirae |
| 3,876,104 A | 4/1975 | Minsky et al. |
| 3,960,289 A * | 6/1976 | Panicci ........................ 220/318 |
| 5,163,577 A | 11/1992 | Lee |
| 5,317,959 A | 6/1994 | Beluzzi |
| 5,339,978 A | 8/1994 | Coppier |
| 5,549,039 A | 8/1996 | Ito et al. |
| 5,638,984 A | 6/1997 | Munari et al. |

FOREIGN PATENT DOCUMENTS

DE 835341 3/1952

* cited by examiner

Primary Examiner—Stephen Castellano
(74) Attorney, Agent, or Firm—Lathrop & Gage, L.C.

(57) ABSTRACT

A handle assembly for a cooking utensil that secures and holds a lid on the utensil so that any liquid contents of the utensil may be easily, safely, and expeditiously poured from the utensil. The handle assembly comprises a handle body and a lever. The handle body is attached to the utensil at one end and has an opposite outer end that may be grasped by a user. The lever, which has a grip end and a clamp end, is rotatably or pivotably secured in an opening in the handle body. When the outer end of the handle body and the grip end of the lever are simultaneously grasped, the clamp end of the lever comes into contact with the lid of the utensil and holds the lid on the utensil while the contents of the utensil are poured out of the utensil through a spout formed in an upper edge of the utensil. When the lever of the handle assembly is not in use, the grip end of the lever is spaced apart from the outer end of the handle body, and the clamp end of the lever is spaced apart from both the upper edge of the utensil and any lid that may be on the utensil. In this orientation, the outer ends of the handle body may be used to lift or move the utensil.

3 Claims, 2 Drawing Sheets

HANDLE FOR LIFTING, MOVING AND SECURING THE LID OF A COOKING UTENSIL

FIELD OF INVENTION

This invention relates to a handle for a cooking utensil that may be used to lift and move the utensil, as well as to hold the lid of the utensil securely in place so that liquid contents of the utensil may be poured out of the utensil with ease.

BACKGROUND OF INVENTION AND PRIOR ART

It is common for utensils to be used to cook solid food in a liquid such as water. The water and solid food is placed in the utensil, the utensil placed on a stove, the contents of the utensil heated, and the food thereby cooked. A lid is typically placed on the utensil to prevent the liquid from boiling or splashing out of the utensil and to retain as much heat as possible inside the utensil while the contents are being cooked, thus reducing the time needed to cook the food.

Common types of utensils used for this purpose are pots, pans, saucepans, kettles, and other containers used to cook food. Such pots, pans, and other such utensils frequently have side handles that permit both handles to be grasped at the same time when the heated utensil must be moved onto or removed from a stove or other surface. Such dual side handles permit the utensil to be handled and moved in a stable, safe, and balanced manner.

When the cooking of the food is completed, it is desirable to remove the cooking liquid, or at least a portion of the cooking liquid, from the container before the food is removed. The removal of the liquid makes it easier and safer to remove the food and, at the same time, removes excess liquid so that the liquid is not transferred to the serving dish in which the food is to be placed, or to the plate from which the food is to be eaten. In addition, if food is cooked in water, it may be desirable to remove the water from the cooked food in order to add new or additional ingredients such as sauces, which may be then be either further cooked or served.

In conventional utensils it can be a difficult and hazardous task to remove the liquid from the utensil after the food is cooked and the food and liquid are still very hot. If the lid is locked onto the utensil, it is necessary to unlock the lid, which can cause burns and possibly spill the contents of the utensil, or cause the utensil to come into contact with and burn or injure persons. If the lid is removed completely from the utensil, it is difficult, if not impossible to pour the liquid from the utensil without also pouring all or a portion of the food out of the utensil.

Typically, the liquid is poured out of the utensil by placing the lid ajar on the top of the utensil, grasping the handle or handles and the lid at the same time with a potholder or other heat protection for the hands, and then, while jointly grasping the lid and handle, tipping or inverting the utensil and pouring the liquid from it, the lid being ajar to permit the liquid to escape while at the same time preventing the food contents from being poured out of or falling from the interior of the utensil. This method of liquid removal has obvious dangers. The user may lose the joint grip on the handle and lid or the contents of the utensil may suddenly shift onto the lid and force the lid completely off of the utensil, resulting in spilling of both the food content and the dangerously hot liquid.

Accordingly, it is desirable to have a utensil handle that can easily and safely be grasped to pour hot liquid from utensils and at the same time hold the lid firmly on the utensil, and it is also desirable to have a conventional handle for use in handling a utensil when it is not necessary to pour liquid from the utensil, to invert or tip a utensil, or have a lid on the utensil.

The prior art discloses a variety of handles that include devices that may be manipulated to secure or lock the lid of a container to the container itself and manipulated a second time to unlock the lid or remove the securing device. Examples are Kramer et al. U.S. Pat. No. 3,416,701 which discloses a handle with a latch to secure the lid to a portable picnic chest; Ostrowsky et al. U.S. Pat. Nos. 3,518,731 and 3,471,054 which disclose a handle with a clamp or clasp to secure the lid on the utensil; Wenthorf U.S. Pat. No. 1,698,929 which discloses a handle with a clamp to secure or lock the lid to the utensil; Graham U.S. Pat. No. 3,080,996 which discloses a handle with a device to lock the lid on the utensil; Shirae U.S. Pat. No. 3,592,352 which discloses a handle that has a locking device to secure a lid on ajar; Minsky et al. U.S. Pat. No. 3,876,104 which discloses a latch for locking the lid of a coffee percolator; Lee U.S. Pat. No. 5,163,577 which discloses pivoting handles to lock a lid on a trash container; Beluzzi U.S. Pat. No. 5,317,959 which discloses a handle device to secure and lock the lid of a pressure cooker; Humphrey U.S. Pat. No. 1,666,012, which discloses a hook and latch arrangement to lock a cooking utensil; Richardson U.S. Pat. No. 1,384,851, which discloses a hook arrangement to secure a lid to a utensil that is operated by moving the handles toward and away from one another; Phillips U.S. Pat. No. 2,403,191, which discloses a utensil with a pivoting handle attached to a lid, the handle being raised and lowered to place the lid on or off the utensil respectively; and Ito et al. U.S. Pat. No. 5,549,039, which discloses insulated food container with device for locking the lid on the container.

The prior art also discloses handle devices that can be manipulated or pivoted to secure the lid on a cooking container, but where the moveable portion of the handle structure is limited by the structure of the handle, or a trigger is used to manipulate or pivot the securing device. Examples are Trulock U.S. Pat. No. 1,685,560 which discloses a handle having a hook and detent that is triggered to secure the lid on a coffee pot or similar container while pouring coffee from the pot and further triggered to disengage the detent and hook; Coppier U.S. Pat. No. 5,339,978 which discloses a spring moveable handle device to holding a lid on a kettle such as a teakettle; and Munari U.S. Pat. No. 5,638,984 which discloses a utensil handle with an interior fixed part connected to the utensil and a pivotable exterior part that secures the lid to the utensil when the utensil is inverted to strain the contents of the container.

Further, German Patent No. 835,341 discloses a utensil with a single pivoting handle that secures a lid to a utensil when the utensil is lifted.

None of the prior art devices or patents, however, appear to provide for: a handle with an outer handle body firmly attached to the utensil that can be used as a conventional handle; a handle with an interior pivotable lever that secures the lid to the utensil while the utensil is inverted for pouring; a handle with an interior privotable lever that has a center of rotation and shape that biases it in the open position away from a fixed exterior body of the handle; a handle with an exterior body that can be used to lift and move the utensil while the interior lever is in it open position so as not to interfere with the use of the fixed exterior body of the handle; a handle with an interior pivotable lever whose motion is not restricted or limited by the exterior part of the handle body or some other portion of the handle structure so a to limit the pivoting of the interior lever; a handle with a pivotable interior lever that maximizes the force applied to the lid to secure the lid to the utensil while the interior lever is pivoted into contact with the lid and liquid contents are being poured from container; and a handle with a pivotable interior lever that rotates into and out of securing contact with the lid without being restricted or limited in such pivoting movement by any other part of the handle structure, such that the handle will still operate properly if the handle parts are not manufactured to precise tolerances, or become dislodged from their original positions and alignment due to extensive use, wear, or accidental damage to the handle parts.

SUMMARY OF THE INVENTION

The inventive handle assembly has a body that is fixed to a side of a utensil. The utensil has a lid to contain the solid and liquid contents of the utensil, and the utensil has a spout to remove the liquid contents of the utensil without removing the lid or separately holding the lid so that it does not separate from the utensil while the liquid contents are poured out of the utensil. The handle body forms an opening to accommodate an interior, pivotable lever that is moveably secured to the body by an axle spanning and secured to sides of the opening. The body also has an outer end that may be grasped by a user. The lever has a grip that may be grasped by a user to pivot the lever and a clamp that makes contact with a rim of the lid or an upper edge of the utensil when the grip of the lever is grasped and lifted by a user.

The lever of the handle has a shape and center of rotation such that, when the user is not grasping the grip, the clamp pivots away from the utensil and the grip is pivoted away from the outer end of the handle. When the lever is in this position, the grip of the lever may be used to lift, move, and other wise manipulate the utensil without the need to use or manipulate the body of the handle.

When the grip of the lever is grasped by a user of the utensil, the grip of the lever moves upward and the clamp of the lever moves downward until it comes into contact with the rim of the utensil, or, if the lid is on the utensil, the clamp of the lever comes into contact with the lid of the utensil. When the lever is in the clamping position, it is not limited in its motion by any other part of the handle, and, as a result, the entire weight of the utensil and its contents, as well as the pressure applied by the user on the lever, are effectively applied as a clamping force between the lid and the clamp end of the lever. When the lever is in clamping position against the rim of the lid, the utensil may be tipped or inverted to pour off the liquid contents of the utensil through the spout without removal or adjustment of the lid so as to allow the contents to escape. In addition, if the body of the handle, the lever, or the axle are not made exactly within manufacturing tolerances, the lever still functions so as to apply the maximum clamping force to the lid to prevent it from dislodging when the utensil is inverted to pour off liquid from the other contents of the utensil.

Although the handle assembly is here described in the context of a utensil for cooking food, the inventive handle assembly can also be used in other contexts. More specifically, it can be used on any utensil from which it is desired to pour liquid while at the same time securing a lid on the utensil.

DETAILED DESCRIPTION OF THE INVENTION

Convention and Definitions

The following convention is used in describing various directions with respect to the inventive handle. The utensil is assumed to be setting on a counter, stove, or other surface in an upright position for normal use. When the utensil is in this upright, normal orientation, the following terms have the following meanings: The terms "up" or "upward" mean the vertical direction extending from the bottom of the utensil toward the top of the utensil and beyond; the terms "down" or "downward" mean the vertical direction that is the opposite of the "up" or "upward" direction—i.e., the vertical direction extending from the top of the utensil toward the bottom of the utensil; the terms "in" or "inward" means the horizontal direction from the periphery or side of the utensil toward the center of the utensil; and the terms "out" or "outward" means the opposite horizontal direction—i.e., the direction from the center of the pot toward the periphery or side of the utensil. If a part or object is "above" another part or object, the part or object is in a position or location that is in the upward direction from the other part or object; thus, the lid of the utensil is above the bottom of the of the utensil when the utensil is in its normal upright position; similarly if a part or object is "below" another part or object, the part or object is in a position that is in the downward direction from the other part or object; thus, the bottom of the utensil is below the lid of the utensil when the utensil is in its normal upright position.

Utensil

Figure 1:
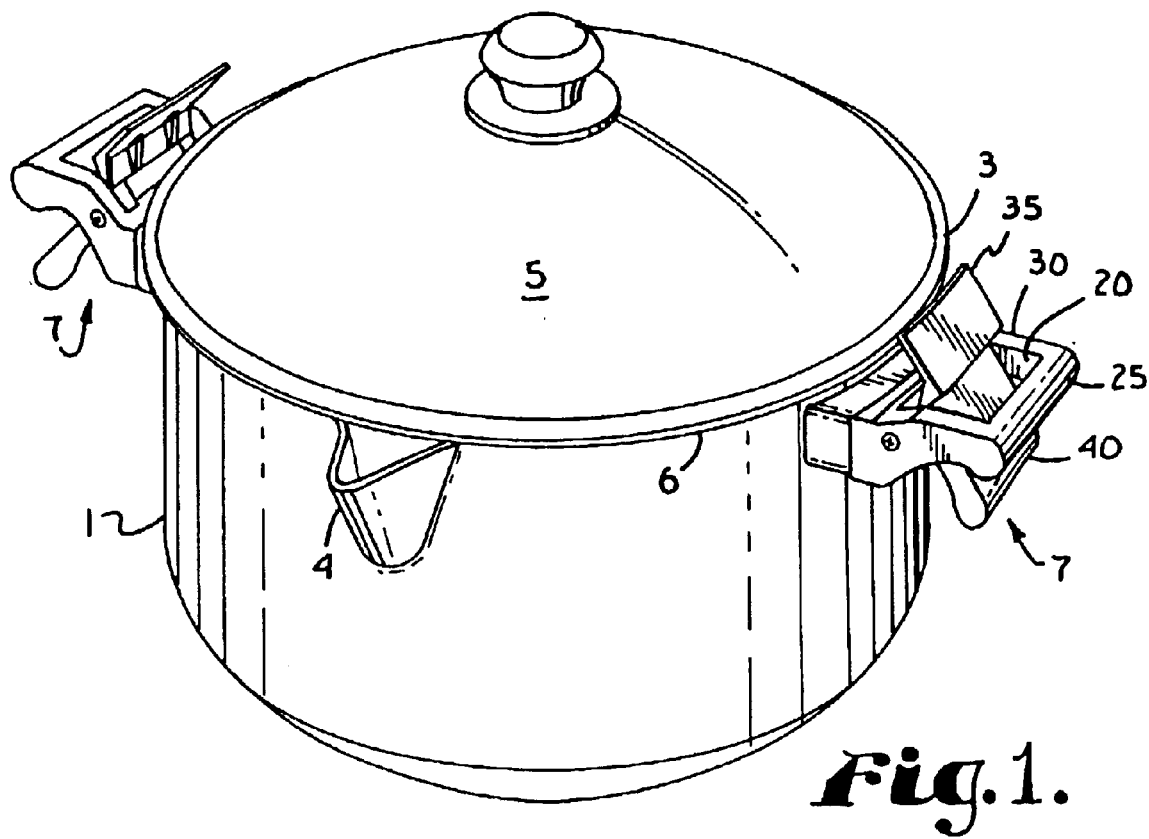
FIG. 1 is a perspective view of a utensil including a handle assembly embodying the present invention.

FIG. 1 shows a utensil 1 having a side 2, an upper edge 3, and a spout 4 through which the liquid contents of the utensil may be poured after the solid contents have been cooked. The utensil 1 may be made of aluminum, stainless steel, ceramic material, or other suitable material for a utensil 1.

Utensil Use and Contents

As described above, utensils such as utensil 1 are commonly used to cook solid foods, such as vegetables, potatoes, pasta, or other food products. The cooking of such foods is typically done while the food is submerged in water or some other cooking liquid, such as soup stock, water, or oil. In the case of foods cooked in water or oil, it is desirable or necessary to remove or separate the water or oil from the food before the food can be placed in a serving dish or on a plate for eating. The inventive handle assembly allows the water or other liquid contents of the utensil 1 to be removed from the utensil 1 and separated from the solid food contents of the utensil 1 by pouring such liquids out of the utensil 1. In the case of liquid foods such as soup or soup stock, the inventive handle assembly 7 may be used to easily and safely pour all of the liquid and solid contents from the utensil 1 after such contents have been cooked. With this understanding, this detailed description will, for reasons of brevity, simplicity, and illustration, usually describe the use of the utensil 1 for cooking solid foods such as vegetables, potatoes, and pasta in water, oil, or other liquid, unless, or course, some other use is noted.

Lid

As shown in FIG. 1, the utensil 1 is supplied with a lid 5 having a rim 6. The lid 5 may be placed on top of the utensil 1 when the contents of the utensil 1 are being cooked. The lid 5 may be made of the same material as the utensil 1, of a different material such as glass or plastic, or of a combination of materials such as metal and glass. In the case of glass lids, the lid 5 should preferably have a metal or other resilient rim to resist any force applied to it during the pouring process described below.

It is also possible to use a lid with a downward extension (not shown) that fits just inside the circumference of the upper edge 3 of the utensil 1. In this case, a portion of the downward extension of the lid 5 should be provided with holes or openings that may be located adjacent the spout 4 to permit the liquid contents to be poured through the holes or openings and the spout 4 during the pouring operation. Alternatively, such a downward extension may be provided with holes or openings in one location and with a larger opening or gap in another location on the downward extension of the lid 5. Thus, when the utensil 1 is to be used to cook solid foods from which the water, oil, or other cooking liquid is to be removed by pouring, the portion of the downward extension containing the holes or openings my be placed adjacent the spout 4 to prevent the solid items from being poured from the utensil 1. When the entire contents of the utensil 1 are to be poured from the utensil 1, as might be the case for soup, the larger opening or gap of the downward extension my be placed adjacent the spout 4 to allow the pouring of both solid and liquid contents out of the utensil 1 through the spout 4.

Handle Assembly

Figure 2:
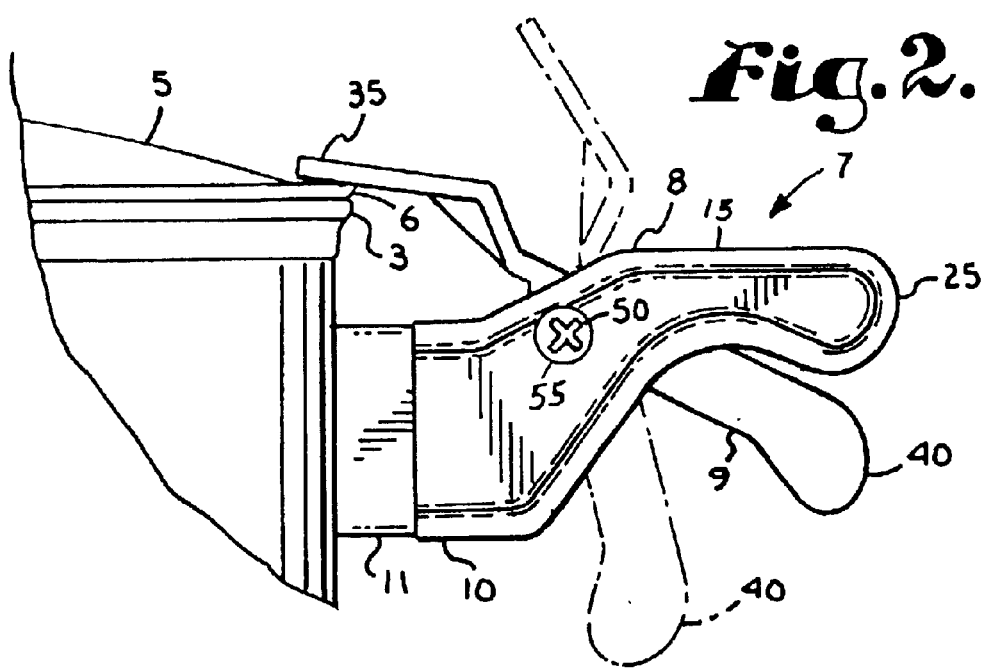
FIG. 2 is a side view of the handle assembly showing a lever of the handle assembly clamping the lid of a utensil and, in dashed lines, showing the lever in an open position.
Figure 3:
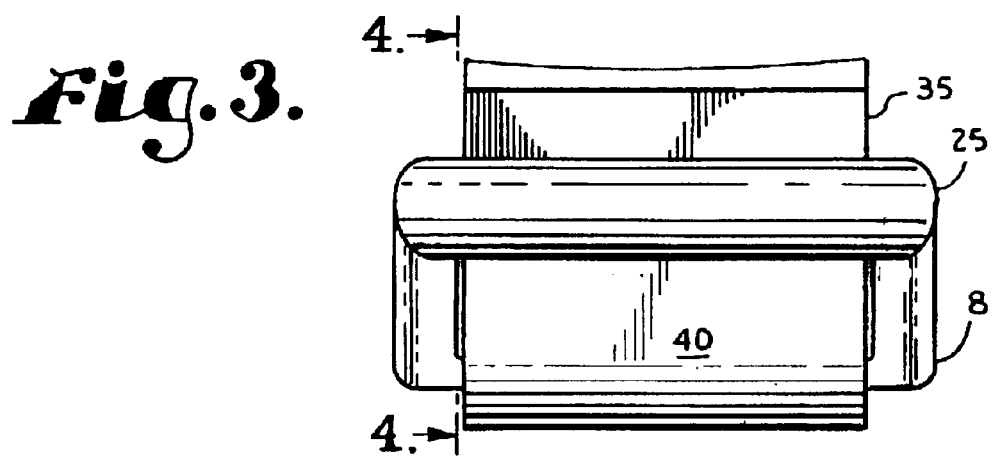
FIG. 3 is a rear end view of the handle assembly showing the lever in an open position, not clamping the lid.

The utensil 1 has a handle assembly 7 comprising a body 8 and a pivotable lever 9, as shown in FIGS. 2 and 3. In the utensil 1 shown in FIG. 1, there are two handle assemblies 7 shown opposite one another on the utensil 1. On round or circular utensils 1 such as shown in FIG. 1, the handle assemblies are positioned opposite one another on a diameter of the circular utensil 1, or one handle assembly 7 at an arbitrary location on a circumference of the round utensil 1 and a second handle assembly 7 at a location on the circumference that is 180 degrees from the location of the first handle assembly 7.

Since the handle assemblies 7 of the utensil are preferably substantially identical to one another, this detailed description will describe just one such handle assembly 7 with the understanding that the utensil 1 embodying the inventive handle assembly 7 will have two such handle assemblies 7 in the locations described above.

It is understood that the utensil 1 need not be circular or round. It could be square, rectangular, oval, or some other irregular shape. In such cases the handle assemblies 7 should be placed opposite one another so that the utensil 1 can be lifted in a balanced manner and the liquid contents poured from it. Thus, in the case of a utensil with a square shape, the handle assemblies 7 would be located at the centers of opposite sides of the utensil 1. In utensils of other shapes, the handle assemblies 7 would be located opposite each other so that when they are gripped and the utensil 1 lifted for pouring, the utensil will be balanced and not lean or tip in one direction or another without user action to tip or invert the utensil 1.

The handle assembly 7, the body 8, and the pivotable lever 9 may be made of suitable durable and strong materials. Preferably the handle assembly 7, the body 8 and the lever 9 are made of phenolic material that is heat resistant and fails to conduct heat efficiently. The use of such materials prevents the handle assembly 7 and its constituent parts from becoming excessively hot during the cooking operation and may allow the user to grip and use the handle assemblies 7 without hand protection such as a potholder or insulated gloves. Other materials that may be used for the handle assemblies 7, bodies 8, and levers 9 include nylon, rubber, and various plastics.

Spout Location

As generally shown in FIG. 1, the spout 4 should be located along the circumference of the upper edge 3 of the utensil 1 at a location that is preferably equidistant from and between the two handle assemblies 7—i.e., 90 degrees from each handle assembly 7 along the circumference of the upper edge 3 of the utensil 1. For convenience, it may also be desirable to have two spouts 4 on the utensil 1, each located opposite one another along the circumference of the upper edge 3 of the utensil 1, or 90 degrees from each handle assembly 7. Such dual spout construction of the utensil 1 would allow the liquid contents of the utensil 1 to be poured out through either of the dual spouts of the utensil 1 according to the convenience or orientation of the user as the handle assemblies are gripped or manipulated for pouring.

If the utensil 1 is to be used to make soups or other liquid foods containing solid food items, the spout 4 may be made larger to accommodate the pouring of both the food solids and the liquid from the utensil 1 though the spout 4. Alternatively, two spouts 4 may be incorporated in the utensil 1, one larger spout 4 for pouring soups and the like containing solid foods and one smaller spout 4 for removing or pouring liquids, but not food solids from the utensil 1. In such constructions, the spouts may be opposite from one another along the perimeter of the utensil 1. It is also possible to use a single larger spout 4 with an insertable strainer for use in the case when the liquid contents, but not the solid contents, are to be poured out of the utensil 1.

Handle Body

Figure 4:
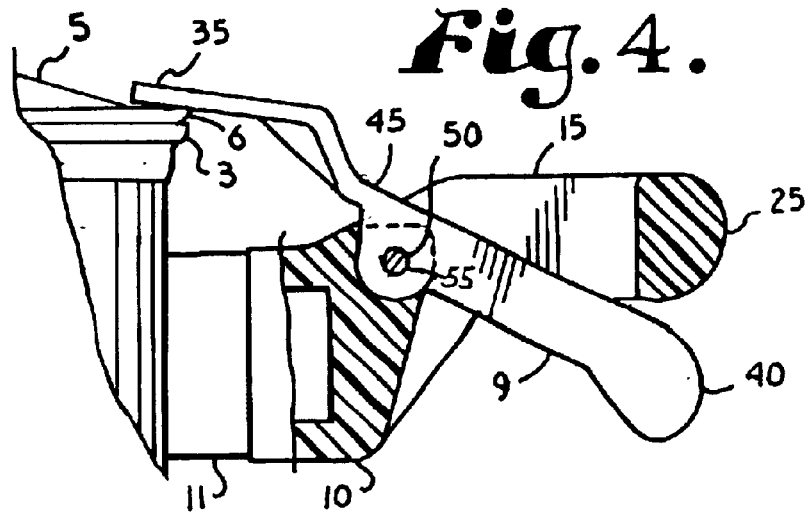
FIG. 4 is a cross sectional view of the handle assembly taken along 4—4 of FIG. 3 showing the lever clamping the lid of the utensil.

Ass shown in FIGS. 2 and 4, the body 8 of the handle assembly 7 comprises a mounting end 10, a mount 11, and an outer portion 15 that forms an opening 20 such that the body 8 has outer end 25 and side arms 30 (see FIG. 1). A part of the outer portion 15 proximate the outer end 25 generally forms a crossbar extending between the side arms 30. The opening 20 in the outer portion 15 of the body 8 of the handle assembly is generally rectangular in shape and sized so that it accommodates the pivotable lever 9.

Handle Lever

As shown in FIG. 4, the lever 9 comprises a clamp end 35, a grip end 40, and a central portion 45. An axle 50 extends into or through, but is not firmly secured to, the central portion 45 of the lever 9. The axle 50 may, if desired, extend into or through, but not be rigidly secured to, an extension 53 of the central portion 45 of the lever 9 as shown in FIG.

Figure 5:
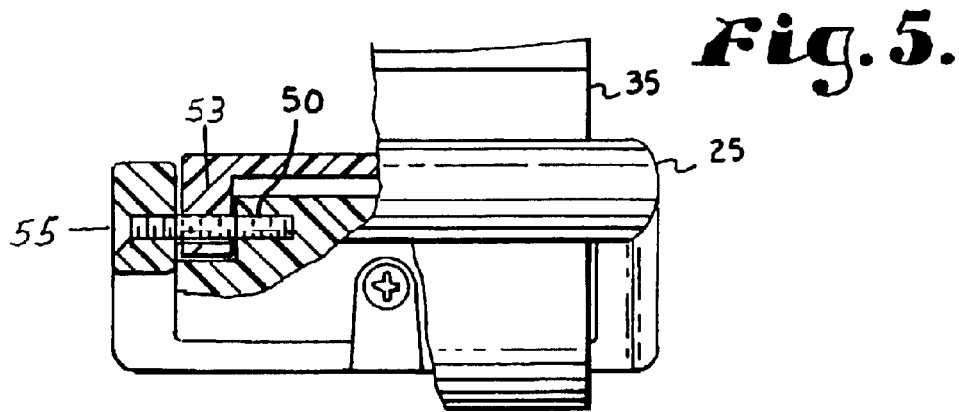
FIG. 5 is a partial cross sectional view of the rear end view of FIG. 3 with a breakaway showing one embodiment of an axle of the handle assembly.

5. As shown in FIG. 2, the ends 55 of the axle are firmly secured to the side arms 30 of the outer portion 15 of the handle body 8. So constructed and connected, the lever 9 is moveable secured to the body 8 of the handle assembly 7, and the lever 9 may pivot or partially rotate around the axle 50. In the case of the embodiment shown in FIG. 5, the axle 50 comprises two screws, the ends 55 (see FIGS. 2 and 5) of which are firmly secured to the side arms 30 of the outer portion 15 of the handle body 8, but which screws extend into the extension 53 of the central portion of the lever 9 but are not firmly secured to the central portion 15 of the handle body 8, thus allowing the lever 9 to pivot or partially rotate around the axle (screw) 50. Of course, the axle 50 could also be a single, continuous, longer axle, rather than the two-screw embodiment shown in the FIG. 5. In the case of the single axle 50, the ends 55 of the axle would be firmly secured to the central portion 15 of the handle body 8, but would be inserted through the central portion 45 of the lever 9 so that the lever 9 could pivot around or partially rotate around the axle 50.

Handle Lever in Non-Clamping Position

The grip end 40 of the lever 9 is heavier than the clamp end 35 of the lever so that when no lifting force is applied to the grip end 40, the grip end 40 of the lever 9 rotates downward, and the end of the grip 40 is spaced away from the outer end 25 of the body 8 of the handle assembly 7. When the grip end 40 is spaced away or apart from the outer end 25 of the body 8 of the handle assembly 7, the clamp end 35 of the lever 9 is in an upward position and is spaced apart and away from the rim 7 of the lid 5, or, if the lid 5 is not on the utensil 1, the clamp end 35 of the lever 9 is in an upward position and is spaced apart and away from the upper edge 3 of the utensil 1. The same spaced apart relationship of the clamp end 35 and grip end 40 of the lever 9 when no force is applied to the grip end 40 of the lever 9 my be achieved by moveably securing the central portion 45 of the lever 9 to axle 50 at a location along the length of the lever 9 such that the center of rotation of the lever 9 is closer to the clamp end 35 than the grip end 40. In this latter configuration, the grip end 40 of the lever 9 naturally rotates downward and away from the outer end 25 of the body 8 of the handle assembly 7, in turn causing the clamp end 35 of the lever 9 to rotate away from the rim 6 of the lid 5 or the upper edge 3 of the utensil 1, as the case may be.

Thus, when no lifting force or other contact is made with the grip end 40 of the lever 9, the lever 9 is not near or in contact with the outer end 25 of the body 8 of the handle assembly 7. When the lever 9 is in this position, the outer end 25 of the handle body 8 may be grasped to lift or move the utensil 1 in the same manner as a conventional prior art utensil could be moved and lifted by grasping its handles.

Handle Lever in Clamping Position

When a lifting force is applied to the grip end 40 of the lever 9, the clamp end 35 of the lever 9 moves downward until it comes into contact with the rim 6 of the lid 5, pressing lid 5 downward onto the upper edge 3 of the utensil 1 and preventing the lid 5 from being removed from the utensil 1. The force of the clamp end 35 of the lever 9 on the rim 6 of the lid 5 can be increased by lifting the utensil 1 via the grip end 40 of the lever 9, thus effectively using the weight of the utensil 1 and its contents to apply additional downward force on the rim 6 of the lid 5 via the clamp end 35 of the lever 9. The force of the clamp end 35 on the rim 6 of the lid 5 can also be increased by moving the grip end 40 of the lever 9 and the outer end 25 of the handle body 8 toward one another, or squeezing the grip end 40 of the lever 9 and the outer end 25 of the handle body 8 together.

When both handle assemblies 7 of the utensil 1 are in the clamping position, the utensil may be raised and tipped or inverted so that the liquid contents of the utensil may be poured out of the utensil 1 through the spout 4. Moreover, as the utensil 1 is tipped and its liquid contents poured from it, the grip end 40 of the lever 9 and the outer end 25 of the handle body 8 are squeezed together by both the user and the weight of the utensil 1 and its contents, thus increasing the force of the clamp end 35 of the lever 9 on the rim 6 of the lid 5, preventing the lid 5 from becoming dislodged or separated from the upper edge 3 of the utensil 1 and, as a result, preventing the solid food contents of the utensil 1 from being poured out of or falling out of the utensil 1 while the liquid contents are being poured out or removed from the utensil 1.

It will be noted that the lever 9 of the inventive handle assembly 7 may be used or not used as desired when the lid 5 is not on the utensil 1. When the lid 5 is not on the utensil 1, the utensil 1 may be lifted and moved by gripping the handle body 8, the lever 9 being out of the way in its upward biased position. Alternatively, the grip end 40 of the lever 9 and the outer end 25 of the handle body 8 may be grasped and squeezed together to move or lift the utensil 1. In this latter case, the clamp end 35 of the lever 9 moves downward and presses against the upper edge 3 of the utensil 1 without any affect on the lifting or moving of the utensil 1.

Separation of the Grip End of the Lever and the Outer End of Handle Body During the Clamping Operation When the handle assemblies 7 are in clamping position, as described above, the grip end 40 of the lever 9 does not touch or come into contact with the outer end 25 of the handle body 8. Thus, the movement of the lever 9 is not restricted or limited by the handle body 8, and, as a result, the grip end 40 of the lever 9 and the outer end 25 of body 8 may be squeezed or forced toward one another with maximum force, allowing the clamp end 35 to apply such maximum force to the rim 6 of the lid 5 and, consequently, applying the maximum force to the lid 5 and prevent the lid 5 from becoming dislodged from the utensil 1 while the utensil 1 is being tipped or inverted and the liquid contents are being poured from the utensil 1.

If the movement of the lever 9 were restricted or limited by, for example, allowing the grip end 40 of the lever 9 to touch or come into contact with the outer end 25 of the handle body 8, it would no longer be possible to increase the force between the clamp end 35 of the lever 9 and the rim 6 of the lid 5 or apply maximum force between the clamp end 35 of the lever 9 and the rim 6 of the lid 5, and the lid 5 might dislodge from or partially dislodge from the utensil 1, creating a situation in which solid contents of the utensil 1 could unintentionally or accidentally be poured from utensil 1, or the hot liquid suddenly and dangerously poured or spilled out of the utensil 1 and burn or injure a person.

Moreover, if the grip end 40 of the lever 9 is allowed to touch or come into contact with the outer end 25 of the handle body 8, the lever 9 and the handle body 8, as well as the grip end 40, outer end 25, and other parts of the handle assembly 7 must be manufactured or assembled to more exacting tolerances so that the handle assembly 7 in operation produces the correct amount of force on the rim 6 of the lid 5 in order to prevent movement or dislodging of the lid during the pouring operation. If such manufacturing and assembly tolerances are not met exactly, the handle assembly 7 could malfunction or not operate as intended to prevent pouring of solid contents from the utensil 1 or prevent accidental and dangerous pouring or spilling of the hot liquid contents of the utensil 1 during the pouring operation or the tipping or inverting of the utensil via the handle assemblies 7.

Avoiding Limits or Restrictions on the Movement of Lever

In addition, if the grip end 40 of the lever 9 is allowed to touch or come into contact with the outer end 25 of the handle body 8, or if some other part of the handle body 8, or of the lever 9, restricts or limits the movement of the lever 9, a malfunction of the handle assembly may occur. As indicated above, a malfunction could cause the grip end 40 of the lever 9 to touch or come into contact with the outer end 25 of the handle body 8, thus preventing the fullest application of force by the clamp end 35 of the lever 9 on the rim 6 of the lid 5, and consequently allowing the lid 5 to dislodge from the utensil 1 while the liquid is being poured from the utensil 1. A similar type of malfunction could occur is the various cooperating parts of the handle assembly 7 are dislodged from one another, become out of register, are bent, or otherwise fail to operate as intended due to wear, jarring, or accident. In addition, such a malfunction could occur if the various parts of the handle assembly 7 are not made to correct or proper tolerances.

An example of a malfunction that could occur if the parts of the handle assembly 7 restrict or limit the movement of the lever 9 is a situation in which the clamp end 35 of the lever 9 becomes bent or distorted in a direction away from the lid 5 by frequent use or accident. If this were to occur when the movement of one of the levers 9 is restricted or limited by some other part of the handle assembly 7, the clamp end 35 of the lever 9 would not apply as much force to the rim 6 of the lid 5 when the grip end 40 of the lever 9 is lifted or the grip end 40 and the outer end 25 of the handle body 8 are moved or squeezed together, and, as a consequence, the hot liquid contents of the utensil 1 could pour of spill from the utensil when the utensil 1 is tipped or inverted for pouring.

It can be difficult and expensive to manufacture parts to precise tolerances. Difficulties can occur due to the specific casting or molding process used to make the parts of the handle assembly 7, the nature of the materials used to form the parts of the handle assembly, or difficulties in inspecting the parts once they are made. Of course, malfunction can also occur if various parts of the handle assembly are not made to correct or proper tolerances. For example if the outer end 25 of the handle body 8 is made slightly to large; the handle body 8 is bent or angled slightly downward during fabrication; the grip end 40 of the lever 9 is made slightly too large or bent or angled slightly upward during fabrication; or the axle 50 is not precisely located in the central portion 45 of lever 9, then the grip end 40 of the lever 9 and the outer end 25 of the handle body 8 may come into contact with one another when squeezed together, or parts of the lever 9 and the handle body 8 may come into contact with on another in a way that prevents further movement of the lever 9 such that the force of the clamp end 35 of the lever on the rim 6 of the lid 5 is reduced. When the force of the clamp end 35 on the rim 6 is thus reduced, the lid 5 is not as securely pressed against the utensil 1, and the solid contents may be unintentionally or accidentally poured from the utensil 1 during the pouring or tipping operation, or the hot liquid may be suddenly or unintentionally spilled from the utensil 1 during the pouring or tipping operation.

The construction of the handle assembly described above, in addition to other advantages, minimizes the difficulties and risks of malfunction that can arise from misalignment of parts via accident or wear, or parts that are not made to precise or correct tolerances. As a consequence, the invention also minimizes the cost of making such parts. The minimization of such difficulties, malfunctions, and costs is accomplished by minimizing the number of places where the parts of the lever 9 and the handle body 8 can come into contact with one another, as well as by maintaining a space or separation between the grip end 40 of the lever 9 and the outer end 25 of the handle body 8 when the lever 9 is being used to clamp the lid 5 on the utensil 1, all as described in detail above.

Lever Position in Handle Body

It will also be noted that the lever 9 is positioned inside the handle body 8—i.e., in the opening 20 of the handle body 8 as shown in FIGS. 1 and 2. This construction maximizes the size of the handle body 8 as compared to the lever 9, allowing the outer portion 15 and outer end 25 (the most frequently used parts of the handle assembly) to be easily and securely grasped for lifting and moving of the utensil 1 in a stable manner. In addition, the placement of the lever 9 inside the opening 20 of the handle body 8 allows for the minimum interference of the lever 9 with the outer portion 15 and the outer end 25 of the handle body 8 when the lever 9 is not in use. Moreover, this construction allows the grip end 40 to be made longer (wider in the direction perpendicular to the length of the lever 9, or alternatively, wider in the directions parallel to the axle 50) than is shown in FIGS. 1, 2 and 3—i.e., by extending such length or width of the grip end 40—should one wish to do so in order to also maximize the surface area of the grip end 40 of the lever 9 for grasping during the lifting or tipping of the utensil 1 to allow liquid contents to be poured therefrom. The extension of the grip end 40 of the lever 9 may be done, if desired, because the grip end 40 does not come into contact with the outer end 25 of the handle body 8 when the grip end 40 is lifted or the grip end 40 and the outer end 25 of the handle body 8 are squeezed together to cause the clamp end 35 to apply force to the rim 6 of the lid 5 so as to keep the lid 5 on the utensil 1 when the contents of the utensil 1 are to be poured therefrom.

Use of Handle Assembly

When the utensil 1 is not in use, the levers 9 of the handle assemblies 7 are oriented in their disengaged positions, namely the clamp ends 35 of the levers 9 are spaced apart from the upper edge 3 of the utensil 1, and the grip ends 40 of the levers are spaced apart from the outer ends 25 of the handle body 8. When the levers 9 are in this orientation, the utensil 1 may be lifted and moved by grasping the outer ends 25 of the handle bodies 8. Food and cooking liquid may then be placed into the utensil 1. Thereafter, the lid 5 is placed on the utensil 1, and the utensil 1 is placed on the stove or other heating surface for cooking. When the food in the utensil 1 is cooked, the outer ends 25 of the handle bodies 8 may be grasped to remove the utensil 1 from the stove. In order to drain the liquid from the utensil 1, the outer ends 25 of the handle bodies 8 and the grip ends 40 of the levers 9 are simultaneously grasped, such that the clamp ends 35 of the levers 9 are brought into contact with the rim 6 of the lid 5 to secure and hold the lid 5 on the utensil 1. While the lid 5 is so secured and held, the utensil 1 is tipped or partially inverted so that the spout 4 is lowered. As the spout 4 is lowered, the liquid contents of the utensil 1 are poured out of the utensil 1. After the liquid contents of the utensil 1 have been poured out of the utensil 1, the utensil 1 may be returned to its upright position and placed on a shelf or other surface. The grip ends 40 of the levers 9 and the outer ends 25 of the handle bodies 8 are released, and, after both are released, the levers 9 return to their disengaged position in which the clamp ends 35 of the levers 9 are spaced apart from the upper edges 3 of the utensil 1, and the grip ends 40 of the lever are spaced apart from the outer ends 25 of the handle body 8. When the levers 9 are so oriented, the lid 5 is removed from the utensil 1, and the drained food contents of the utensil 1 may be removed from the utensil 1.

What is claimed is as follows:

1. A handle assembly for a utensil on which a lid may be placed, said handle assembly comprising:

(a) a handle body attached to the utensil, said handle body having an outer portion defining an opening and an outer end; and (b) a lever having a grip end and a clamp end opposite said grip end and defining a longitudinal axis from said grip end to said clamp end, said lever being rotatably secured to said handle body within said opening in said outer portion of said handle body by an axle moveably secured through an axle receiver in a central portion of said lever substantially perpendicular to said longitudinal axis, said axle having opposite ends attached to said handle body such that said grip end of said lever is moveable toward and away from said outer end of said handle body; wherein (c) when said grip end of said lever is moved toward said outer end of said handle body, said clamp end of said lever contacts the lid of the utensil to secure the lid on the utensil, said contact between said clamp end and the lid preventing said grip end of said lever from moving far enough to make contact with said outer end of said handle body.

2. A handle assembly for a utensil on which a lid may be placed, said handle assembly comprising:

(a) a handle body attached to the utensil, said handle body, having an outer portion defining an opening and an outer end, said outer portion of said handle body includes opposed side arms positioned on opposite sides of said opening and (b) a lever having a grip end and a clamp end opposite said grip end, said lever being rotatably secured to said handle body within said opening in said outer portion of said handle body said lever is rotatably secured to said handle body by an axle attached to at least one side arm of said handle body, said axle further having at least one extension moveably secured within an axle receiver in a central portion of said lever, such that said grip end of said lever is moveable toward and away from said outer end of said handle body; wherein (c) when said grip end of said lever is moved toward said outer end of said handle body, said clamp end of said lever contacts the lid of the utensil to secure the lid on the utensil, said contact between said clamp end and the lid preventing said grip end of said lever from moving far enough to make contact with said outer end of said handle body.

3. A handle assembly for a utensil on which a lid may be placed, said handle assembly comprising:

(a) a handle body attached to the utensil, said handle body having an outer portion defining an opening and an outer end; said outer portion of said handle body includes opposed side arms positioned on opposite sides of said opening and (b) a lever pivotably secured to said handle body within said opening in said outer portion of said handle body by an axle attached to at least one side arm of said handle body, said axle further having at least one extension moveably secured within an axle receiver in a central portion of said lever, said lever having a grip end and a clamp end opposite said clamp end, said grip end of said lever being moveable toward and away from said outer end of said handle body whereby, when said grip end of said lever is pivoted toward said outer end of said handle body, said clamp end of said lever contacts the lid of the utensil and holds the lid on the utensil, but said grip end of said lever does not come in contact with said outer end of said handle body.

* * * * *